United States Patent [19]

Avny

[11] Patent Number: 5,507,622

[45] Date of Patent: Apr. 16, 1996

[54] PLASTIC MOLDED TORQUE CONVERTER TURBINE

[75] Inventor: Eli Avny, Northville, Mich.

[73] Assignee: Ford Motor Company, Dearborn, Mich.

[21] Appl. No.: 371,260

[22] Filed: Jan. 11, 1995

[51] Int. Cl.$^6$ ................................................. F01D 5/30
[52] U.S. Cl. ............... 416/180; 416/197 C; 416/229 R; 416/244 R
[58] Field of Search ................. 416/180, 197 C, 416/229 R, 241 A, 244 R; 60/330

[56] References Cited

U.S. PATENT DOCUMENTS

| 3,386,244 | 6/1968 | Helmer | 416/180 |
| 4,957,414 | 9/1990 | Willingham | 416/229 R |
| 5,226,807 | 7/1993 | By et al. | 416/180 |
| 5,358,382 | 10/1994 | Muhlbach | 416/229 R |

FOREIGN PATENT DOCUMENTS

| 2361481 | 6/1974 | Germany | 416/229 R |
| 2449596 | 4/1976 | Germany | 416/241 A |

Primary Examiner—Edward K. Look
Assistant Examiner—James A. Larson
Attorney, Agent, or Firm—Frank G. McKenzie; Roger L. May

[57] ABSTRACT

A turbine wheel of a torque converter for an automatic transmission is formed of fiber-reinforced plastic resin molded about a powder metal hub having a disc formed with tabs extending radially from a central flange, and openings extending through the thickness of the disc at angularly spaced intervals. The plastic resin of the turbine wheel fills the spaces between the tabs, extends through the holes formed through the disc, and forms a bond to the surface of the disc on which it is molded.

8 Claims, 2 Drawing Sheets

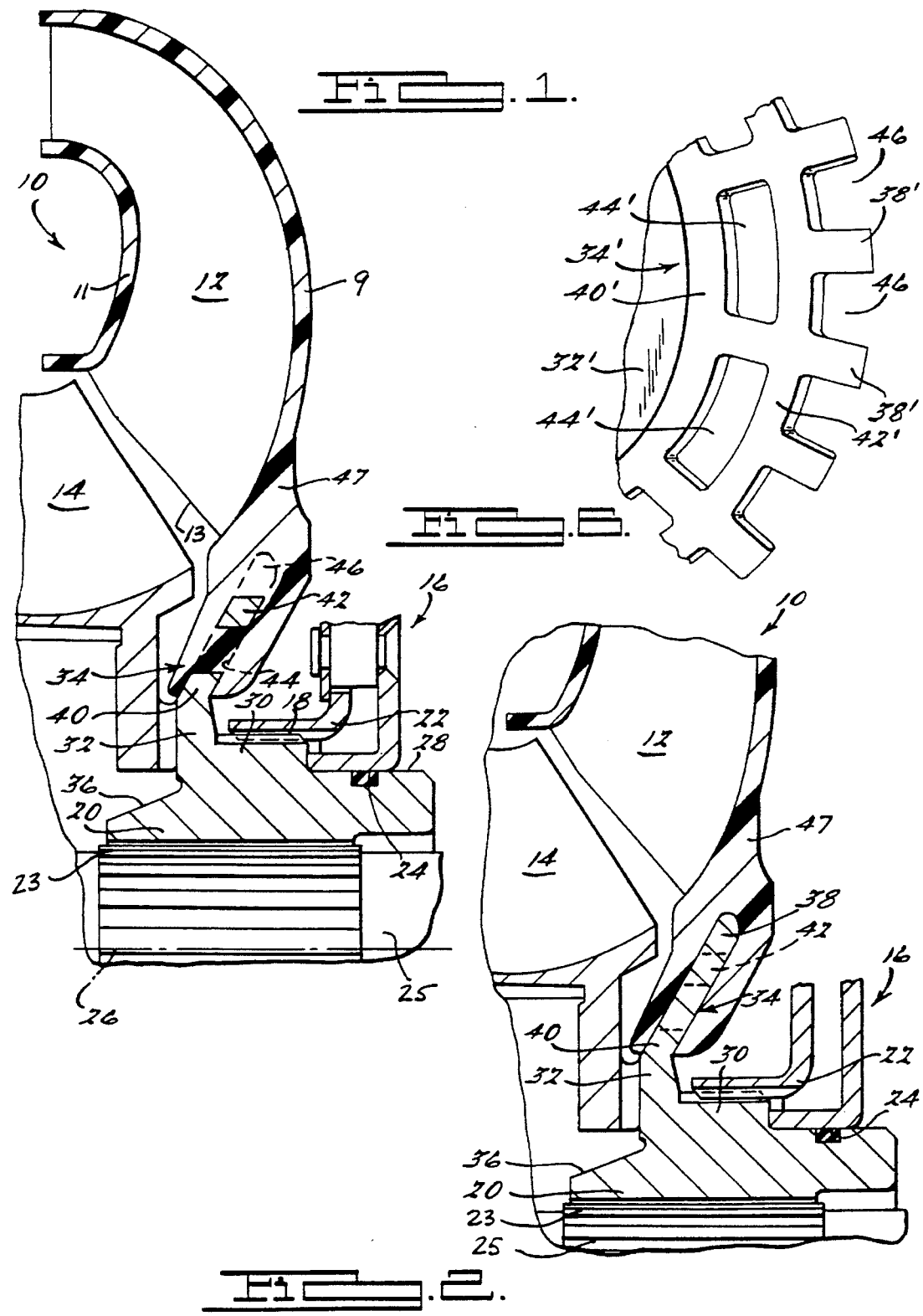

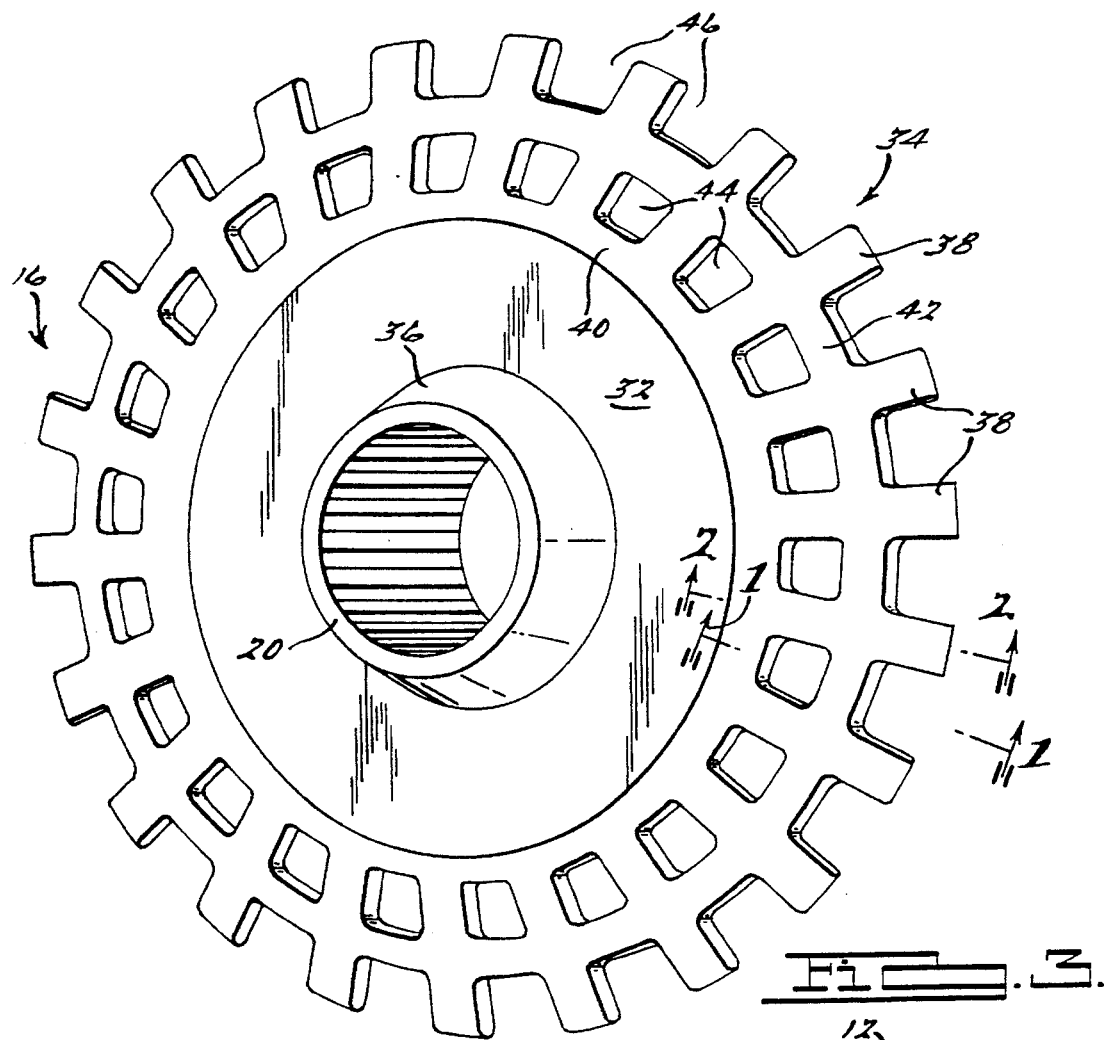
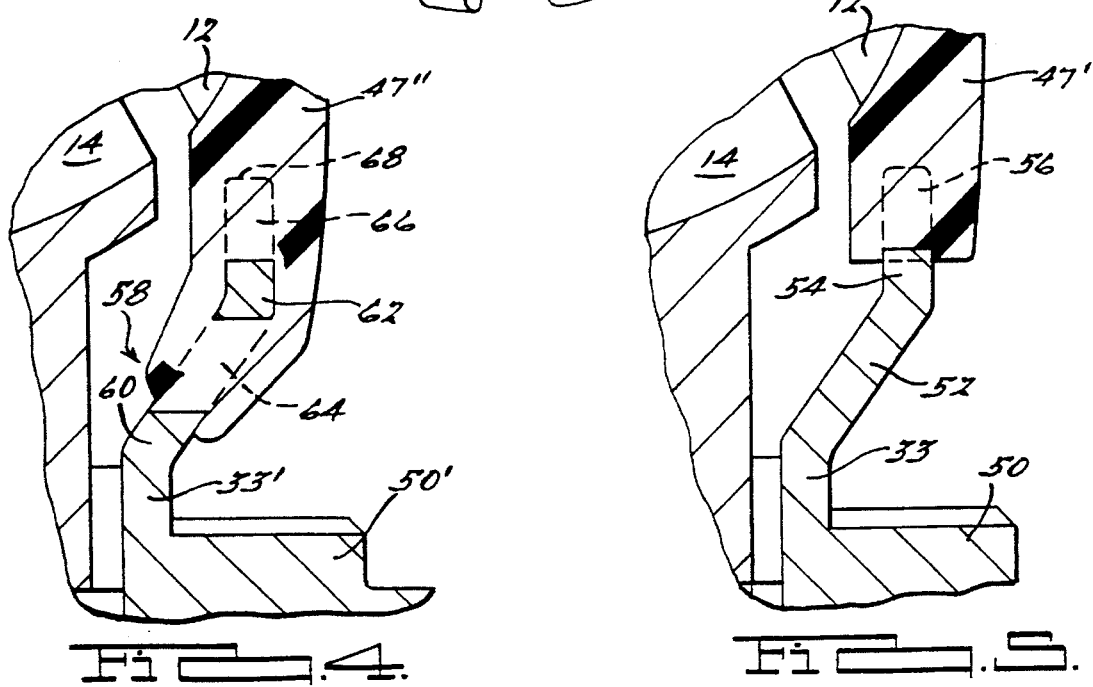

5,507,622

PLASTIC MOLDED TORQUE CONVERTER TURBINE

BACKGROUND OF THE INVENTION

1. Field of the Invention

This invention relates to the field of torque converters and fluid couplings for use in automatic transmissions for motor vehicles.

2. Description of the Prior Art

Conventionally, the turbine of a hydrokinetic torque converter comprises three components: a shell, vanes, and a shroud. In order to structurally join these three components, both the shell and shroud are currently slotted to receive, through the slots, tabs formed on the vanes. After the vanes are located within the shroud, the tabs are bent or rolled over to form a mechanical attachment on the shroud that holds the vanes fixed in position. To facilitate automatic vane assembly, clearance must be provided between the slots and the tabs. This clearance results in leakage of hydraulic fluid through the thickness of the shell, which leakage causes a substantial penalty performance, operating efficiency and fuel economy. A turbine wheel formed of fiber-reinforced plastic resin composite material eliminates the need for slots through the shell thickness because the shell, vanes, and shroud are molded integrally. Furthermore, a composite turbine wheel also eliminates the gap between the shell and vanes and offers potential for significant improvement in fuel economy. An additional advantage resides in the incorporation of an airfoil-shaped blade. U.S. Pat. No. 5,226,807 describes a turbine wheel of this type.

Loads carried by the turbine wheel are transmitted to an input shaft of the transmission through a spline connection. Use of a spline for this purpose requires that the hub of the turbine wheel be formed of metal and that it be part of the load path between the turbine and transmission input shaft. The turbine is subjected to axially directed loads, torsion, and radially directed centrifugal forces and thermally induced loads.

A rigid joint between a plastic turbine wheel and a metallic hub can cause significant difficulties. For example, the composite plastic material has a lower stiffness and strength in comparison to the strength and stiffness of the metallic hub. If the hub and turbine wheel are attached mutually by a rigid connection, they are required to deflect as a single structural member. Such a rigid attachment can induce high stresses into the composite material.

Another difficulty is associated with the substantially greater thermal expansion coefficient of the composite turbine wheel in comparison to that of a metal hub. Because of this, temperature within an operating torque converter, which may vary between −40° F. and 450° F., can cause large thermal stresses in the composite material.

SUMMARY OF THE INVENTION

This invention is applicable to a fluid coupling or torque converter for drivably connecting a power source and transmission gear train. It includes a wheel comprising having a hub providing some means for drivably connecting the gear train and hub, usually meshing splines or another suitable mechanical connection. The hub is formed with a disc having tabs extending radially outward from the hub axis, each tab having a tip located at the radially outer end thereof, the tabs spaced mutually about the axis of the hub at substantially equal intervals, the tabs interconnected by a ring located radially between the hub and tips. The disc is formed with blank spaces extending angularly between radially outer portions of tabs and with holes passing through the thickness of the disc and located radially between the ring and hub.

A bladed or vaned element in the form of a partial torus has a radially inner shell and a radially outer shroud supporting vanes spaced mutually about the axis of the hub. The outer shroud has a flange surrounding and bonded to the tabs and disc, portions of said flange being located in said spaces between the tabs and within said holes.

BRIEF DESCRIPTION OF THE DRAWINGS

FIG. 1 is a partial cross section taken through a longitudinal plane of a turbine wheel of an automotive torque converter; that plane passes through the plane 1—1, shown in FIG. 3.

FIG. 2 is a partial cross section similar to that of FIG. 1, taken at plane 2—2 of FIG. 3.

FIG. 3 is a isometric view of a turbine wheel hub for a torque converter.

FIGS. 4 and 5 are partial cross sections showing alternate embodiments of the connection between a molded plastic turbine wheel and a metal turbine hub.

FIG. 6 is an alternate form of the hub of FIG. 3.

DESCRIPTION OF THE PREFERRED EMBODIMENT

Referring first to FIG. 1, a hydrokinetic torque converter 10 includes a vaned or bladed impeller wheel connected to the crankshaft of an internal combustion engine. A turbine 12 having vanes 13 spaced mutually about the torque converter axes, a vaned stator 14, and the impeller define a toroidal fluid flow circuit, whereby the impeller is hydrokinetically connected to the turbine. The stator 14 is supported rotatably on a stationary stator sleeve shaft, and an overrunning brake anchors the stator to the sleeve shaft to prevent rotation of the stator in the direction opposite the direction of rotation of the impeller, although free-wheeling motion in the opposite direction is permitted. The vaned wheel 12 has the form of a partial torus, which when assembled with the impeller and stator forms a torus. The wheel includes an outer shroud 9 and inner shell 11 supporting vanes 13 at their inner and outer peripheries.

The torque converter assembly 10 usually includes a lock-up clutch assembly 16 located within the converter impeller housing, a portion of the clutch assembly being connected by a spline 18 formed on a flange 22 to a shoulder of a metal turbine hub 20, the shoulder having an external spline adapted to receive the internal spline formed on the flange 22. An hydraulic seal 24, located in a recess formed on the turbine hub 20, prevents the passage of hydraulic fluid located within the impeller housing. The turbine hub 20 is connected, generally through a spline connection, to a shaft 25 having an axis aligned with the longitudinal axis 26 of the turbine wheel 12.

The turbine wheel may be formed of thermosetting or thermoplastic resin, preferably of injection molded, glass fiber-reinforced phenolic resin, preferably the material called phenolic MPC 7534 sold commercially by Rogers Corporation, Molding Materials Division, Manchester, Conn. A preferred alternate material is ASM Stanyl TW 241 F10, sold by Engineering Plastics, 2267 W. Mill Road, Evansville, Ind. Those skilled in the art will appreciate in view of this disclosure that other types of plastic materials could be used with a device according to the present invention.

The hub 20 is preferably formed of powdered metal, such as FC 5008-5D, sold by Chicago Powdered Metal Products Co., of Shiller Park, Ill. An acceptable alternate material from which the hub can be formed is stamped or forged steel.

The hub 20 includes a cylindrical outer surface 28, in which a recess for the seal 24 is formed; a shoulder 30, on which the external spline is formed; a radially directed flange 32 extending outward from the shoulder; a conical disc 34 extending axially and radially from the radial extremity of flange 32; and a conical portion 36 facing the impeller wheel.

Referring now to FIG. 3, the radially directed flange 32 supports conical disc 34, which is in the form of a grid of multiple radially directed tabs 38, each tab spaced angularly about the axis of the hub 26 from adjacent tabs, holes 44, and spaces 46. Conical disc 34 is formed with an inner ring 40, located between radial flange 32 and the base of each tab 38 and extending circumferentially about the axis of the hub, thereby providing structural circumferential continuity among the tabs 38 and flange 32. Located radially outward from ring 40 is a second ring 42 that extends circumferentially about the axis of the hub and provides structural continuity among the tabs 38. Rings 40 and 42 are of residual material remaining after punching radially inner holes 44 through the thickness of the conical disc 34 and radially outer material between the tabs 38.

The thickness of the disc is greatest at its radially inner extremity and tapers, preferably at approximately a six degree angle, to a somewhat smaller thickness at the radially outer extremity.

FIG. 3 shows disc 34 formed with 22 radial tabs equally spaced angularly about the hub axis 26, 22 punched radially inner holes 44, and 22 radially outer spaces 46 located between each tab. Thus the number of radial tabs is the same as the number of radially inner holes, and other numbers of tabs and holes may be used with a device according to the present invention. An alternate form of the disc may include a lesser number of inner holes extending through the thickness of disc 34, such as that shown in FIG. 6.

Shroud 9 includes a flange 47, which extends radially inward on opposite side of disc 34. The plastic resin of the turbine wheel 12 containing reinforcing fibers is molded around and bonded to the disc 34 as the resin flows into the holes 44, 44' and the spaces 46 located between the tabs 38. FIG. 2 is a cross section taken at through plane 2—2 of FIG. 3 showing a tab 38 of disc 34 having the plastic resin of the turbine wheel 12 located and bonded to each lateral side of disc 34. In FIG. 1, the cross section taken at plane 1—1 of FIG. 3 shows the plastic resin of the turbine wheel located within the radially outer spaces 46 between each tab 38, in the holes 44, and surrounding the lateral sides of disc 38 and the radially outer extremity of the tab.

FIG. 5, which is an alternate form of the hub 50, includes a flange 33 extending radially from the hub, a conical disc 52 extending radially outward and axially from flange 33 and terminating with tabs 54, spaced angularly about the axis of the hub, extending radially from the radially outer extremity of disc 52, and spaced from adjacent tabs 54 by openings 56, similar to the openings 46 at the radially outer end of disc 32. The plastic resin material of the turbine flange 47' surrounds each axial side and the radially outer end of tabs 54. The flange 47' material is located between the tabs in the openings 56, thereby joining the turbine wheel 12 to the hub 50 by forming a bond on the surfaces of the tabs and providing structural continuity between the right-hand and left-hand sides of the turbine wheel through the openings 56.

Referring now to FIG. 4, hub 50' includes flange 33' extending radially outward from the hub, and a disc 58 extending radially outward and axially from flange 33'. Disc 58 includes an inner ring 60 and an outer ring 62, radially inner holes 64 and radially outer openings 66 located between the tabs 68. The holes, openings, and rings 60, 62 define tabs 68 similar to tabs 38 of FIG. 3, which are surrounded by molded plastic resin of flange 47" of the turbine wheel 12. The radially outer spaces 66 and holes 64 are filled with the plastic resin and provide structural continuity across the thickness of the disc 58. The radially outer end of the tabs 68 extend radially, whereas in the embodiment of FIG. 3 the tabs extend conically.

The form of the invention shown and described herein constitutes the preferred embodiment of the invention; it is not intended to illustrate all possible forms thereof. Understand that the words used are words of description rather than of limitation, and that various changes may be made from that which is described here without departing from the spirit and scope of the invention.

I claim:

1. In a fluid coupling or torque converter, a wheel comprising;

a hub;

a disc having tabs extending radially outward with respect to the hub axis, each tab having a tip located at the radially outer end thereof, the tabs spaced mutually about the axis of the hub at substantially equal intervals, the tabs interconnected by a first ring located radially between the hub and tips; the disc having spaces extending angularly between radially outer portions of tabs; the disc having holes through the thickness of the disc located radially between the ring and hub;

an element in the form of a partial torus having a radially inner shell and a radially outer shroud supporting vanes spaced mutually about the axis of the hub, the outer shroud having a flange surrounding and bonded to the tabs and disc, portions of said flange located in said spaces between the tabs and within said holes.

2. The wheel of claim 1 wherein the tabs extend radially outward with respect to the hub axis in a plane that is inclined axially with respect to said axis.

3. The wheel of claim 1 wherein the tabs are interconnected by a second ring located radially between the hub and radially inner extremity of the tabs.

4. The wheel of claim 1 wherein the holes extend angularly about said axis between radially inner portions of adjacent tabs.

5. The wheel of claim 1 wherein the holes extend angularly about said axis between radially inner portions of angularly alternate tabs.

6. In a fluid coupling or torque converter, a wheel comprising;

a hub;

a disc having tabs extending radially outward with respect to the hub axis in a plane that is inclined axially with respect to said axis, each tab having a tip located at the radially outer end thereof, the tabs spaced mutually about the axis of the hub at substantially equal intervals, the tabs interconnected by a circular ring located radially between the hub and tips; the disc having spaces extending angularly between radially outer portions of tabs; the disc having holes through the thickness of the disc located radially between the ring and hub;

an element in the form of a partial torus having a radially inner shell and a radially outer shroud supporting vanes spaced mutually about the axis of the hub, the outer shroud having a flange surrounding and bonded to the tabs and disc, portions of said flange located in said spaces between the tabs and within said holes.

7. The wheel of claim 6 wherein the holes extend angularly about said axis between radially inner portions of adjacent tabs.

8. The wheel of claim 6 wherein the holes extend angularly about said axis between radially inner portions of angularly alternate tabs.

* * * * *